United States Patent [19]

Harms

[11] 4,438,981
[45] Mar. 27, 1984

[54] HINGE JOINT FOR A TRACK CHAIN

[75] Inventor: Hans-Wilhelm Harms, Ratingen, Fed. Rep. of Germany

[73] Assignee: Intertractor Viehmann GmbH & Co., Fed. Rep. of Germany

[21] Appl. No.: 320,520

[22] Filed: Nov. 12, 1981

[30] Foreign Application Priority Data

Jul. 9, 1981 [DE] Fed. Rep. of Germany ....... 3127104

[51] Int. Cl.³ ............................................. B62D 55/20
[52] U.S. Cl. .................................. 305/14; 184/105 B; 305/58 R
[58] Field of Search ............... 184/105 B; 305/14, 53, 305/56, 58 R, 58 PC; 29/450, 451

[56] References Cited

U.S. PATENT DOCUMENTS

| | | | |
|---|---|---|---|
| 3,762,778 | 10/1973 | Boggs et al. | 29/451 X |
| 3,831,240 | 8/1974 | Boggs et al. | 29/540 X |
| 4,067,414 | 1/1978 | Funke | 184/105 B |

FOREIGN PATENT DOCUMENTS 43354  1/1982  European Pat. Off. ............ 305/14

*Primary Examiner*—David A. Scherbel
*Attorney, Agent, or Firm*—Jacobs & Jacobs

[57] ABSTRACT

A hinge joint for a track chain having a bored pin for the reception of lubricant passed thereinto through a plug in the open end of the pin bore, the other end of which bore is blind, and the plug having a channel extending part way there-through and communicating with a slit leading to the reservoir, and the pin being located in a bushing having a slight space between their walls for the lubricant which can pass to packings in recesses in outer chain links around the pin ends, and inner chain links around the bushing ends inwardly out the outer chain links, the bushing having an opening providing for passage of the lubricant from the reservoir, through the slight space and to the packings in the outer chain links.

9 Claims, 7 Drawing Figures

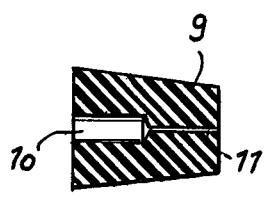
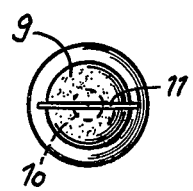
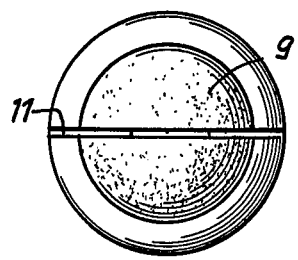
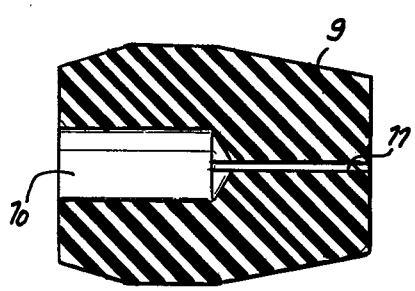
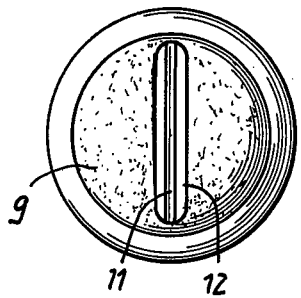
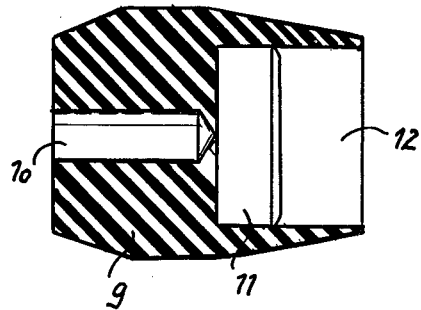

HINGE JOINT FOR A TRACK CHAIN

The present invention relates to a hinge joint for a track chain having a sealed, lubricated bearing device which swingably connects at least two chain links, a pin and a bushing which receives said pin and slides on its outer surface the bearing surface thus provided between the pin and the bushing being futhermore connected to a lubricant reservoir arranged in the bearing device and accessible from the outside, the open end of said lubricant reservoir being adapted to be closed by an elastic plug provided with a channel therein.

Such a hinge joint is known, for instance, from West German Pat. No. 22 10 466.

In that case, the lubricant reservoir is sealed by a perforated elastic plug which, after being filled with lubricant, must be closed by another elastic plug or the like.

This arrangement has the serious disadvantage that, on the one hand, two different parts must be manufactured and mounted in order to obtain the desired seal and, on the other hand, upon the insertion of the auxiliary plug an air cushion which is placed under tension by the insertion of the auxillary plug is also formed below said auxiliary plug and can then result in the auxiliary plug being forced out of the corresponding bore of the main plug.

Proceeding from this prior art, the object of the present invention is to create a hinge joint of the above-described type in which the sealing can be improved and simplified by means of a single closure member while assurance is nevertheless had that no pressurized air cushion can be formed in any case in front of said plug.

In order to achieve this purpose, the invention proposes that the channel should extend only over a part of the length of the plug and be open only towards the outside and that the communicating reduced slit portion of the channel is in communication therewith and with the lubricant reservoir in the pins and the slit extending from said end to the inner end of the plug and over substantially the entire width of the plug, the plug surfaces which form the slit being firmly pressed against each other when the plug is inserted into the open end of the lubricant reservoir.

The filling opening of the lubricant reservoir can be closed by means of this plug after the lubricant reservoir has been filled, in which connection a hollow needle or the like is passed through the channel and slit into the plug, permitting an air cushion to be formed upon the insertion of the plug to close off communication to the outside. This hollow needle is then removed from the channel and slit of the plug and the plug then is in position without residual stress in the corresponding opening which is to be sealed off.

Furthermore, it is also possible to introduce lubricant into the lubricant reservoir only after the insertion of the plug, either by introducing the lubricant through a double hollow tube of which one hollow tube serves as lubricant feed and the other as vent, or alternatively by first producing a vacuum in the lubricant reservoir and then feeding in the lubricant, the lubricant being at least in part drawn in automatically by the vacuum.

By the provision of the slit in the plug the excellent sealing is assured since the surfaces of the plug which are passed through by the slit rest against each other with sufficient residual stress to prevent the passage or escape of lubricant.

The pin preferably has a central bore which is open at one end of the thus formed lubricant reservoir, which bore is connected via a transverse channel through its wall with the bearing surface and the plug being pushed into the mouth of the bore.

It has furthermore been found advantageous for the plug to be of conical shape and to be inserted with its tapered end towards the front into the bore opening or mouth, the plug being at least almost completely cylindrically deformed in its inserted position.

Thereby, the insertion of the plug is greatly facilitated since the conically tapered outermost end serves as a guide for the insertion of the plug into the corresponding mouth of the bore which is to be closed.

On the other hand, however, due to the considerable residual stress of the plug after the insertion into the mouth of the bore assurance is provided that a sufficiently good seal is obtained.

It may be preferred for the plug to form a relatively large conical angle starting grom its inside end over the length corresponding to the length of the slit, to have at least a very flat cone angle in the following region and be shaped as tapering conically outwards in the opposite direction in the region close to the mouth.

In this way, zones of different initial tension are produced over the length of the plug which facilitates the introduction or passage of a member serving for the filling through the bore and the slit and nevertheless assures, particularly in the central region of the plug, a residual stress which is sufficient in all cases to hold the plug in the bore.

In order to facilitate the introduction through the slit of a member which effects the filling and/or venting, it is advantageous that the channel terminate conically towards the slit, at least in the immediately adjacent region.

It is furthermore advantageous for the slit to terminate in front of the side wall of the plug.

In this way assurance is had that upon the insertion of the plug into the corresponding bore there will be no deformation of the slit in the region in which, in case of a continuous slit, the slit would correspond with the wall of the bore.

The plug instead forms on its outer side a smooth continuous surface so that upon its insertion a suitable arrangement and alignment of the slit can result in all cases.

In order to facilitate manufacture, it is further more contemplated that the slit be widened to form an oval blind hole at its end and over a portion of its length.

As a result of this the plug can be manufactured more easily since the slit is simultaneously formed in the same operation, the side walls of the oval blind hole serving as guide for a suitable cutting tool which produces the slit.

It is preferably contemplated that a hollow needle which passes axially through the plug can be removably inserted into the channel and the slit, said needle having on its outside a coupling for a pressure-fluid line.

This arrangement has the advantage that the hollow tube need not be inserted subsequently after the plug has already been stressed, but need merely be pulled out after the insertion of the plug and the filling of the lubricant reservoir.

In the accompanying drawings illustrating embodiments of the invention:

FIG. 2 shows in cross-sectional side view the plug of FIG. 1 in relaxed position before insertion into the bore of the lubricant reservoir;

FIG. 3 is a front view of the plug of FIG. 2;

FIG. 4 shows a variant form of the plug of FIG. 2 in cross-sectional side view;

FIG. 5 shows the plug of FIG. 4 in end view analogously to FIG. 3;

FIG. 6 shows still another variant form of the plug of FIG. 2., and;

FIG. 7 shows in end view the variant plug form of FIG. 6.

Figure 1:
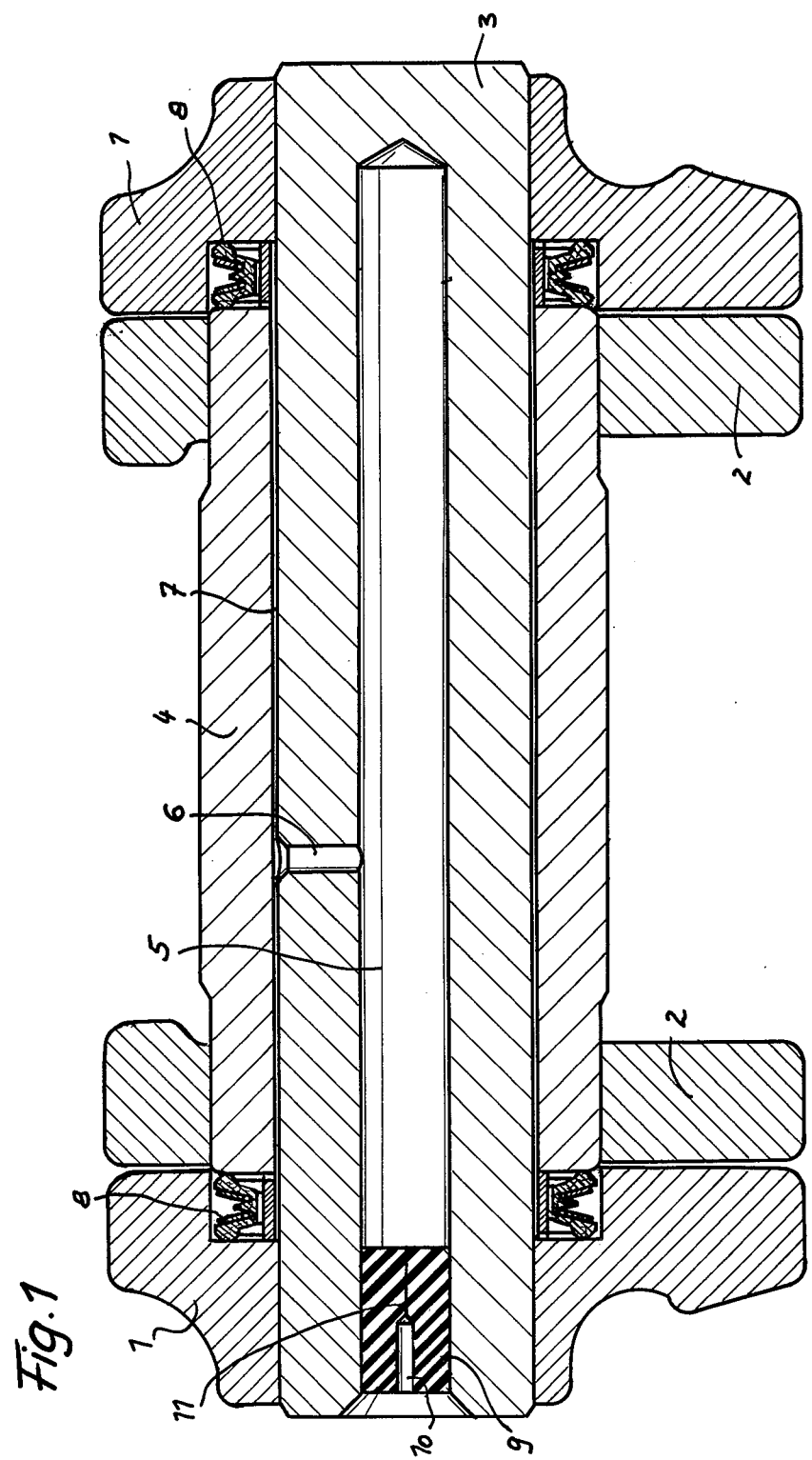
FIG. 1 shows in cross section a hinge joint of a track chain according to the invention.

FIG. 1 diagrammatically shows in sectional view a hinge joint of a track chain of the invention having a sealed lubricated bearing device, wherein the hinge joint includes chain links consisting essentially of two outer chain links 1, two inner chain links 2, adjacent the chain links 1 a bored pin 3 and a bushing 4 extending through the inner chain links into the outer chain links.

The outer chain links 1 are connected with the pin 3 for example in the form of a shrink fit and the inner chain links 2 are similarly connected to the bushing 4. The pin 3 is provided with a bore 5 which is open towards the outside at one end as shown in FIG. 1 the bore serving as a lubricant reservoir.

The bore 5 is connected via a transverse channel 6 with a space 7 between the bushing 4 and the pin 3, the space in turn being in communication with the packings 8 which are located in recesses in the chain links 1 beyond the ends of bushing 4. The packings 8 prevent the escape of lubricant to the outside.

The bore in pin 3 is conically flared or bevelled on its mouth side for the reception of plug 9 which is inserted into the mouth under the residual stress established by the material itself.

The plug 9 has a cylindrical channel 10 extending from the outside of the mouth over about one-half of its length. The channel 10 communicates with a narrow slit 11 extending to the bore 5.

In accordance with the embodiments of FIGS. 1 to 5, the slit 11 extends over the entire width of the plug. As can be noted from FIGS. 2 and 5, the plug surfaces which form the slit 11 are only a slight distance apart from each other when the plug 9 is not in position.

However, if the plug is properly inserted into the bore 5 of the pin 3 (see FIG. 1), the plug 9 is so compressed by the wall of the bore that the plug surfaces adjacent to the slit 11 rest in sealing fashion against each other under mutual residual stress.

The plug 9 has a conically tapered shape towards its front end in the direction of insertion so that this conical surface aids the compressed introduction of the plug 9 which is composed of elastic or deformable rubber or other suitable compressible and expandable material.

The deformation of the plug 9 upon insertion into the bore 5 is such that, as can be observed from FIG. 1, the plug is of substantially cylindrical shape in its inserted position.

As compared with the embodiment shown in FIGS. 2 and 3, in which the cone angle is constant over the entire length of the plug, the embodiment of FIGS. 4 to 7 are formed so that the front end of the plug first tapers conically relatively strongly while being shaped approximately cylindrically in its central region and the outer end region is formed conically in the opposite direction.

The cylindrical central region commences approximately in line with the transition between the slit 11 and the channel 10 and terminates approximately in line with the center of the channel 10 as viewed in a longitudinal direction. By this construction, zones of different initial stress are created on or in the plug 9, which has been found to be highly favorable for actual operation and use. The channel 10 is furthermore conically tapered towards the slit 11 at least in the immediately adjacent region.

In the embodiment shown in FIGS. 6 & 7, the slit 11 does not extend over the entire width of the plug 9 but terminates in front of the side wall of the plug. As a result, the slit cannot be deformed upon introduction of the plug 9 into the bore 5. Furthermore, the slit 11 is widened to form an approximately oval blind hole 12 at its end over a part of its length so that the tool which forms the slit 11 is guided by this blind hole. The manufacture of the plug 9 is thus facilitated. The plug 9 preferably consists of elastic or deformable rubber.

In order to fill the lubricant reservoir in the bore 5, the plug 9 is first inserted into the mouth of the bore 5 and a vacuum then established via a hollow tube (not shown) which is passed through the channel 10 and the slit 11.

In this manner it can then be determined whether the packings 8 and the plug 9 are in correct sealing position.

Thereupon lubricant is fed through the hollow tube, by being drawn by the vacuum into the bore 5, the transverse bore 6 and the space 7 up to the packings 8. Furthermore, the lubricant is introduced under pressure so that a substantially complete filling of the lubricant reservoir up to the packings 8 is obtained.

The hollow tube referred to above is then removed from the slit 11 and the channel 10, whereupon the plug surfaces forming the slit then rest tightly against each other under residual stress.

Alternatively, the lubricant reservoir could also be filled by introducing the lubricant while the chain is standing on its side and thereafter closing the bore 5 by the plug, in which case a vent tube (not shown) must be inserted through the channel 10 and the slit 11 when the plug is inserted.

The invention comprises the novel individual components and their combination and assemblage as a hinge joint of a track tread or chain and particularly such a hinge joint swingably connected two or more links in articulated manner.

I claim:

1. A hinge joint for a track chain comprising a pin having a bore therein, a bushing around the pin and slightly spaced therefrom, a radial or transverse channel through the wall of the pin communicating with the space between the pin wall and the adjacent bushing surface, outer chain links encircling the opposite ends of the pin and having packing receiving recesses in the inwardly facing link walls, packings in said recesses beyond the bushing ends, inner chain links encircling the ends of the bushings and disposed adjacent to but out of contact with the other chain links, and one end of said bore terminating in a blind closed terminus and the other outer or mouth end of the bore having a plug of compressible material inserted therein and which plug has a channel communicating with a reduced slit leading to the mouth of the bore the plug being compressed along its entire length by the walls of said bore such that said plug forms a seal with said bore along the entire length of said plug and the plug surfaces forming said slit rest tightly against each other under residual stress, whereupon lubricant introduced through said channel of said plug passes through said slit and into said bore to said packings and wherein said slit is sealed by the residual stress to prohibit lubricant from leaking from said bore through said plug.

2. A hinge joint according to claim 1, wherein the pin is open at one end only of the lubricant reservoir and the plug is forced under compression into the open mouth end of the bore.

3. A hinge joint according to claim 1, wherein the plug is initially of conical shape and is inserted with its tapered end towards the front into the bore mouth opening; the plug when inserted becoming at least substantially completely deformed into cylindrical shape.

4. A hinge joint according to claim 1 wherein the plug forms a relatively large cone angle starting from its inside end over a length corresponding to the length of the slit, and at least one very flat cone angle in the following region, being shaped tapering conically outwards in the opposite direction in the region close to the mouth.

5. A hinge joint according to 1, wherein the channel extends conically towards the slit at least in the region immediately adjacent thereto.

6. A hinge joint according to claim 1, wherein the slit terminates in front of the side wall of the plug.

7. A hinge joint according to claim 6, wherein the slit is widened at one end to form an oval blind hole over a part of its length.

8. A hinge joint according to claim 1, including means for introducing lubricant, is which means is provided with a tubular needle which on its exterior has a coupling to a pressure-fluid-line passing axially through the plug and removably inserted into the channel and the slit.

9. A hinge joint according to claim 1, wherein the plug consists of elastic rubber.

* * * * *